May 14, 1946.  E. H. GREIBACH  2,400,112
SYSTEM FOR MEASURING DIFFERENCES OF POTENTIAL
Filed July 25, 1942  2 Sheets-Sheet 1
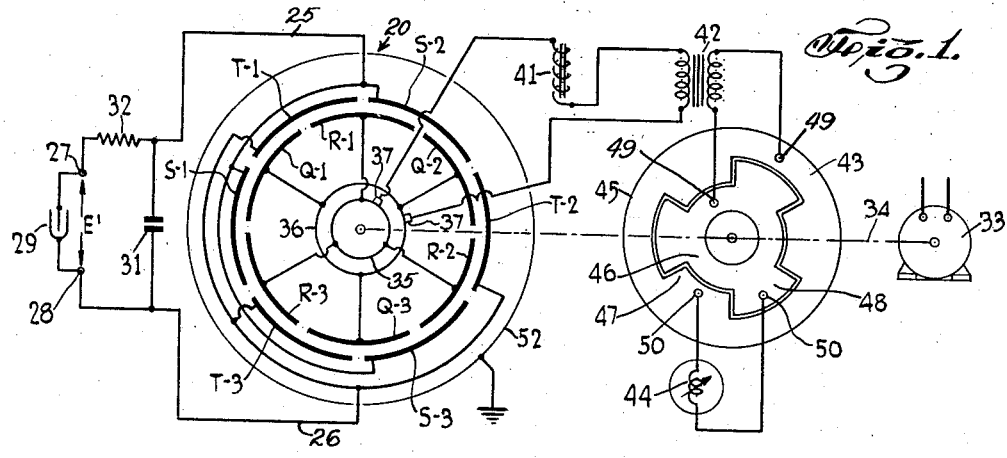
Fig. 1.
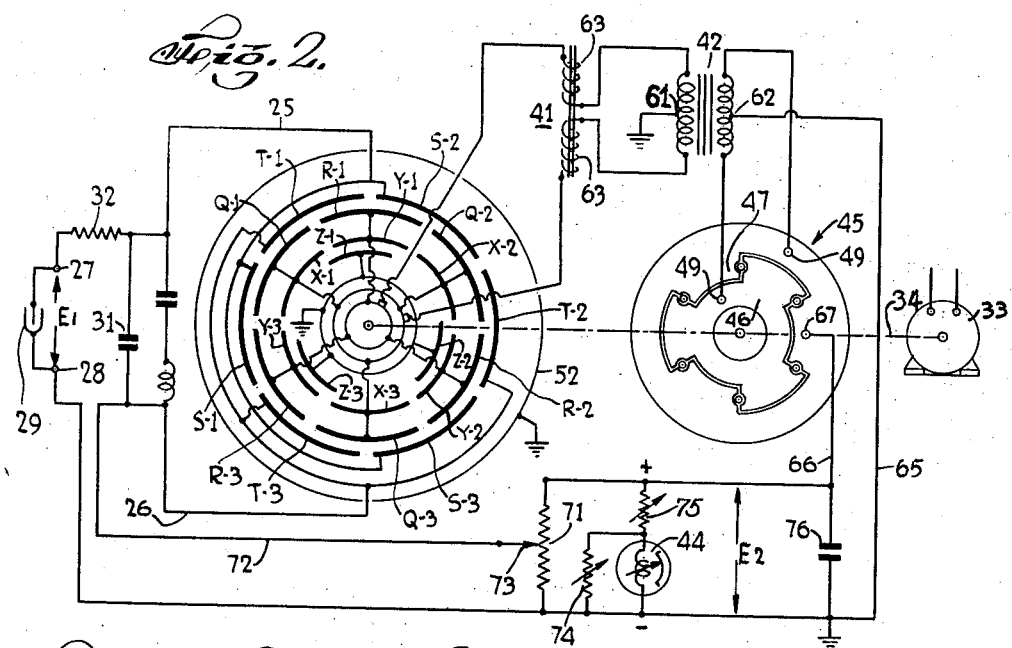
Fig. 2.
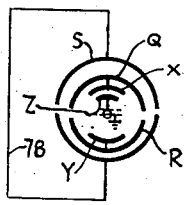 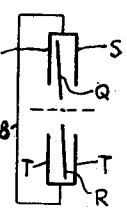 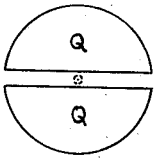 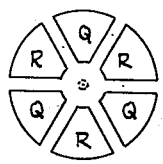 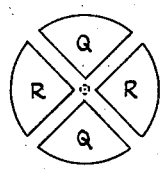
Fig. 3.  Fig. 4.  Fig. 5.  Fig. 6.  Fig. 7.
INVENTOR
E. H. GREIBACH
BY S. Michael Pinelas
ATTORNEY May 14, 1946. E. H. GREIBACH 2,400,112
SYSTEM FOR MEASURING DIFFERENCES OF POTENTIAL
Filed July 25, 1942 2 Sheets-Sheet 2
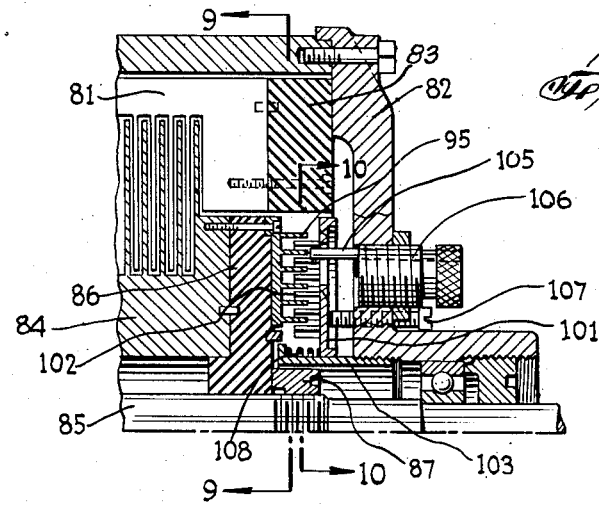
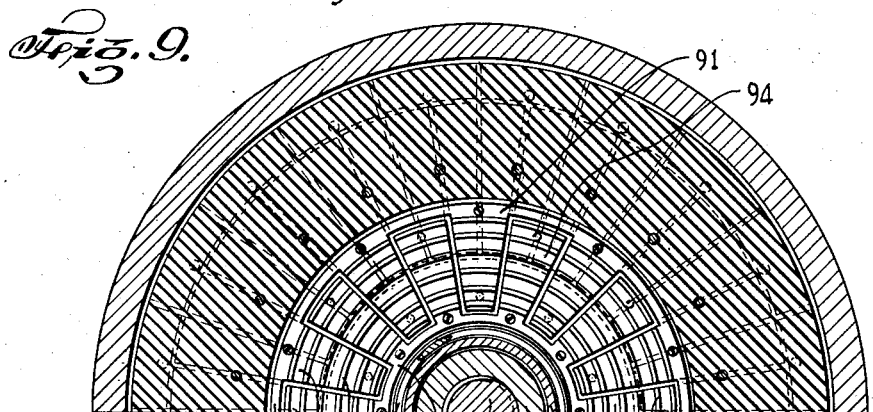
INVENTOR
E. H. GREIBACH
BY S. Michael Prueles
ATTORNEY Patented May 14, 1946

2,400,112

UNITED STATES PATENT OFFICE 2,400,112

SYSTEM FOR MEASURING DIFFERENCES OF POTENTIAL

Emil H. Greibach, Brooklyn, N. Y.

Application July 25, 1942, Serial No. 452,291

28 Claims. (Cl. 171—95)

This invention relates to systems for measuring differences of potential, and more particularly to condenser-alternator measuring systems of the type disclosed and claimed in my U. S. Patent 2,290,875, issued July 28, 1942.

Among the objects of the invention is a rotary condenser measuring system of the foregoing type embodying means for assuring that the movement of the measuring instrument operated by it, notwithstanding its high sensitivity, is quickly brought to rest at the position of its indication; such rotary condenser measuring system using a rotary condenser apparatus combined with means for compensating for mechanical imperfections in the construction of the condenser apparatus, thereby greatly simplifying the task of building such rotary condenser measuring systems which are free from disturbances due to parasitic charges building up in the system.

The foregoing and other objects of the invention will be best understood from the following description of exemplifications thereof, reference being had to the accompanying drawings wherein Fig. 1 is a diagrammatic view illustrating the principles underlying a rotary condenser measuring system of the type disclosed in U. S. Patent 2,290,875;

Fig. 2 is a diagrammatic view of a rotary condenser measuring system of the type shown in Fig. 1, modified to exemplify one form of the invention;

Fig. 3 is a simplified diagrammatic view of the elements of a rotary condenser apparatus having imperfectly mounted condenser elements;

Fig. 4 is a view similar to Fig. 3 showing another type of imperfect mounting of the condenser elements;

Figs. 5, 6 and 7 show elevational views of the rotor elements for a condenser apparatus of the type shown in Fig. 4 having one pair, three pairs and two pairs of condenser segments;

Fig. 8 is a vertical cross-sectional view of one practical form of rotary condenser apparatus exemplifying the invention;

Fig. 9 is a view along line 9—9 of Fig. 8;

Fig. 10 is a view along line 10—10 of Fig. 8;

Fig. 11 is an expanded perspective view of a cooperating stator segment and rotor segment of a condenser apparatus shown in Fig. 8; and Fig. 12 is a view similar to Fig. 11 of the overlapping circular condenser sections of opposite polarity associated with the condenser rotor of the apparatus shown in Fig. 8.

In my U. S. Patent 2,290,875, there is disclosed a novel rotary condenser measuring system of the type shown diagrammatically in Fig. 1, utilizing a rotary condenser apparatus 20 for measuring by a standard measuring instrument 44, such as a D'Arsonval meter, directly connected to the condenser apparatus, without any intermediate amplifier, very small D. C. voltages of the order of $10^{-3}$ or less of a potential source 29, such as an electrolytic cell, without drawing any but an infinitesimal current therefrom which does not affect its potential.

As indicated in Fig. 1, the rotary condenser apparatus 20 used in such measuring system comprises an inducing member having two arrays of condenser sheet elements of opposite polarity — represented by the three interconnected condenser sheet segments S—1, S—2, S—3 of one polarity—and three interconnected similar condenser sheet segments T—1, T—2, T—3 of opposite polarity—and a cooperating induced member having two arrays of induced condenser sheet elements of opposite polarity—represented in Fig. 1 by the three interconnected condenser sheet segments Q—1, Q—2, Q—3 of one polarity, and three interconnected similar sheet segments R—1, R—2, R—3 of opposite polarity, associated with rotary means arranged to produce periodical, constant-frequency variations of the capacitive coupling between the inducing and the induced condenser sheets.

In the commercial form of such condenser apparatus, the individual condenser sheet segments S—1, S—2 . . . T—1, T—2 . . . of the inducing member, form part of a stator structure composed of an annular array of exactly alike condenser segment units, such as shown in Fig. 11, each having a peripheral yoke 81 and a set of condenser disc segments S extending inwardly adjacent to each other from the yoke 81; and the individual sheet segments Q—1, Q—2 . . . R—1, R—2 . . . of the induced condenser member form part of a rotor structure composed of an annular array of exactly alike rotor segment units, such as shown in Fig. 11, each segment unit being composed of a yoke 84 and a set of condenser disc segments R substantially coextensive in area with the disc sheet segments of the stator segment unit, and extending therebetween so that they may be rotated relatively thereto for varying the capacitive coupling between the induced disc segments of opposite polarity and the inducing disc segments of opposite polarity. Such assembled condenser structure forms thus, in effect, a stack of annular stator discs spaced from each other by a gap, and each disc being subdivided into adjacent segments of opposite polarity, and a similar stack of annular rotor discs rotatively mounted in the gaps between the stator disc, and each rotor disc being subdivided into similar adjacent segments of opposite polarity.

In each stator disc of such rotary condenser apparatus, the stator segment units S—1, S—2 . . . of one polarity alternate with the stator segments T—1, T—2 . . . of opposite polarity, and all stator segments of one polarity are electrically interconnected in the manner indicated diagrammatically in Fig. 1. Similarly, in each stator disc, the rotor segments Q—1, Q—2 . . . of one polarity alternate with the rotor segments R—1, R—2 . . . of opposite polarity, and all rotor segments of the same polarity are electrically interconnected in the manner indicated diagrammatically in Fig. 1.

When all the segments of the rotor are in position of overlapping alignment with the segments of the stator, the pairs of induced and inducing segments of opposite polarity are in one position of maximum capacitive coupling, representing the working capacity of the rotary condenser apparatus, which may be designated as C. Rotation of the rotor, from a position of maximum capacitive coupling, by an angle corresponding to an angle of a segment unit, to the next position of maximum capacitive coupling, reverses the polarity of the rotor segments with respect to the stator segments. Thus, the rotation of the rotor segments relatively to the stator segments effects periodical reversals of the maximum capacitive coupling represented by the working capacity of the rotary condenser, in the way more fully explained in my Patent 2,290,875.

In the present commercial rotary condenser measuring system shown diagrammatically in Fig. 1, all stator segments S—1, S—2 . . . of one polarity and all stator segments T—1, T—2 . . . of opposite polarity are connected by input leads 25, 26, respectively, to two input terminals 27, 28 to which the source of unknown voltage or potential which is to be measured, such as a voltage cell 29, is connected. The input circuit to the stator segments S—1 . . . T—1 . . . is provided with a filter including a shunting impedance formed of a condenser 31 and a series impedance formed of a resistance 32, and applies to the stator segments of opposite polarity the potential of the source 29.

The rotor is rotated by a constant speed motor 33, through a shaft 34, and the interconnected rotor segments Q—1 . . . R—1 . . . of opposite polarity are similarly all interconnected to two slip rings 35, 36, respectively, of opposite polarity. The periodically alternating charges induced on the rotor segments are led by the slip rings 35, 36 through two brushes 37 directly to a measuring circuit including a tuning inductance 41, a matching transformer 42 and a rectifying commutator 43 rotated by the motor shaft 34 in synchronism with the rotor to a measuring instrument 44.

The commutator 43 is adjustable to proper phase relation with the rotor segments for zero commutation, and is shown formed of two flat conducting slip ring sections 45, 46 having interfitting commutator segments 47, 48, corresponding, respectively, to the two sets of rotor segments Q—1 . . . R—1 . . . of opposite polarity, for cooperation with two slip ring brushes 49 of opposite polarity and two commutator brushes 50 of opposite polarity, connected to the secondary winding of the transformer 42 and the measuring instrument 44, respectively. Furthermore, the rotary condenser apparatus is protected by a grounded enclosing shield 52.

With such rotary condenser measuring system, the potential difference applied by the potential source 29 to the two sets of stator condenser segments S—1 . . . T—1 . . . of opposite polarity, induces in the rotating condenser segments of opposite polarity Q—1 . . . R—1 . . . alternating electric charges which are discharged as a measuring current through the meter circuit, the commutator serving to rectify the alternating rotor current and to impress it in the form of a rectified D. C. current on the measuring instrument 44.

In such measuring system, a relatively large measuring current, sufficient for actuating a standard measuring instrument 44, is produced by including in it an inductance 41 or, in general, an inductive impedance which is of the order of the impedance of the maximum working capacity of the condenser at the frequency of the alternating charges induced in the rotated rotor segments of opposite polarity.

By designing the rotor condenser of such measuring system so that the inducing and induced condenser sections form part of a large number of generally circular disc-like bodies subdivided into a large number of adjacent segments of opposite polarity, so that they form in the position of maximum capacitive coupling a capacity in the range between about $2 \times 10^{-11}$ farad and $2 \times 10^{-9}$ farad, and by driving the rotor with a standard synchronous motor, so that the voltage alternations of the order of 600 cycles per second are induced, it is possible to provide a practical rotary condenser measuring system of the type shown in Fig. 1 for enabling the measurement of small D. C. voltages of the order of $10^{-3}$ volts full scale with a standard measuring instrument 44.

Thus—in a practical construction of such rotary condenser measuring system, having a rotary condenser of about 2400 micro-microfarad working capacity driven by a synchronous motor at a constant speed to induce voltage alternations at a frequency of 600 cycles per second—the measuring circuit may be tuned for resonance at such frequency with a low loss tuning coil 41 having an inductance of about 25 henries and a Q of 60. To obtain the maximum power output for operating the measuring instrument, the coupling or matching transformer 42 is designed with a ratio at which the resistance of the measuring instrument coil, or in general of its elements, reflected in the primary side of the matching transformer, is equal to the resistance of the remaining part of the tuned rotor circuit, including its inductance coil 41.

In applications requiring the highest sensitivity, it is essential to operate such rotary condenser measuring system with a measuring instrument having the highest sensitivity, namely, a D'Arsonval measuring instrument having a coil of a great many turns moving in a very strong magnetic field and operating with a weak control spring.

When a D'Arsonval instrument movement of very high sensitivity, such as one having only a few microamperes full scale, is moving to an indicating position, a large counter-electromotive force will be induced in its coil, so that its apparent resistance or motional impedance is very high. As a result, such instrument will have generally a very high damping resistance frequently exceeding 100,000 ohms. If such highly sensitive instrument is used in a circuit, such as the measuring circuit of the rotary condenser system shown in Fig. 1, having a low resistance, it will be highly overdamped, especially if the resistance of the secondary winding of the matching transformer 42 is low. Under such conditions, it will take a minute and more for the movement and pointer of the instrument to arrive at the equilibrium position corresponding to a new indication. Such conditions are very undesirable in a practical measuring system.

Fig. 2 shows diagrammatically one form of a novel improved rotary condenser measuring system, of the general type shown in Fig. 1, but embodying various novel advantageous features, including features for overcoming the above described sluggishness of a sensitive measuring instrument used in such system.

The principal elements of the rotary condenser measuring system of the present invention, shown diagrammatically in Fig. 2, are generally similar to those of Fig. 1, and they are designated by similar reference characters. One feature of the improved measuring system shown in Fig. 2 resides in the arrangement which makes it possible to utilize only one commutator brush for rectifying the alternating rotor current delivered to the measuring instruments. According to the invention, this is made possible by arranging the circuit interconnections between the rotary condenser segments and the measuring instrument as a balanced system having intermediate neutral circuit elements interconnected with the commutator circuit.

In the system of Fig. 2, showing one form of such balanced commutator circuit interconnections, the matching transformer 42 has its primary and secondary windings provided with mid-taps 61, 62 arranged so that each winding is balanced into two equal halves. The inductance coil 41 is likewise arranged in the form of two equal winding halves 63, which are interconnected in the leads from the ends of the primary windings of the matching transformer 42 to the rotor slip rings 35, 36 of opposite polarity, the balanced circuit being complemented by the grounded part of the rotary condenser structure, indicated by its grounded enclosing shell 52 and the grounded mid-tap 61 of the primary transformer winding. The ends of the secondary winding of the matching transformer 42 are connected to the slip ring brushes 49 of the commutator, as in Fig. 1, and the midpoint 62 of the secondary transformer winding is connected through a lead 65, shown grounded, to one side of the measuring instrument coil 44, the other coil end being connected through lead 66 to the single commutator brush 67 riding on the commutator segments 47, 48 of the commutator, thereby completing the balanced measuring circuit.

This arrangement makes it possible to use only a single commutating brush for completing the rectifying circuit interconnections between the rotary condenser and the measuring instrument. The elimination of the additional commutator brush that would otherwise be required is very important because it not only eliminates an element that wears, but also because all problems connected with the operation of a circuit opening and closing commutator element are cut in half, a very desirable feature. This factor is particularly important because whenever commutating brushes are used in accurate measuring instruments, all phases connected with the design and the cooperative relationship of the brush and the commutator involve careful and elaborate design, in order to prevent them from becoming a source of inaccuracies.

I have also found a way, one practical form of which is shown in Fig. 2, for making it possible to operate such rotary condenser measuring system with an extremely sensitive measuring instrument of the moving coil type, such as a D'Arsonval movement, and assuring that the measuring movement and its pointer is promptly brought to the position of rest at a new indication.

In accordance with the invention, I take advantage of the very high motional impedance characteristic of the coil of a very sensitive measuring instrument when moving to a new position—which characteristic is responsible for its sluggish operation in a rotary condenser measuring system of the type shown in Fig. 1—and utilize a part of the high voltage developed across this acquired high motional impedance of the moving measuring coil, for increasing it by regenerative feedback to the input side of the rotary condenser generator, to speedily bring the moving meter coil and its pointer to the new reading position.

As explained before, to get a maximum output in the measuring circuit connected to the rotary condenser, the matching transformer 42 is given a ratio at which the resistance of the meter coil 44 reflected into the primary side of the transformer is equal to the resistive component of the impedance of the tuning coil 41 and the remaining part of its circuit.

When the meter coil 44 moves to a new indication position, its apparent or motional impedance is greatly increased, thereby greatly increasing the voltage developed across the meter coil, although the actual power output delivered to the meter is reduced because of the increase in its effective impedance.

According to the invention, all or a part of the increased voltage developed across the measuring instrument, when its coil moves to a new reading, is regeneratively fed back into the input side of the generator, in such a way as to regeneratively increase the total input voltage applied to the generator, and produce across the measuring instrument a voltage high enough for quickly bringing the movement to its new position of equilibrium, without any effective reduction of the accuracy of the measuring system or its sensitivity.

In designing the rotary measuring system provided with a regenerative feed back which is rendered effective by the great motional impedance acquired by the meter coil as it moves to a new equilibrium position, care must be taken to prevent the system from becoming unstable and oscillatory. To this end, provision is made for adjusting the regeneratively fed back voltage so that during equilibrium conditions of the system, the regeneration is very small, only a few percent, and permitted to become substantial only during the motion of the meter coil. When excessive feedback occurs, its maximum value may be kept within the limits required for stable operation by interconnecting the meter coil with auxiliary circuit impedance elements so arranged and proportioned as to positively limit the maximum motional or apparent impedance developed across the secondary winding of the matching transformer 42, within a required maximum value, so as to assure that the regenerative feedback is kept below a maximum desired for stable operation.

In Fig. 2 is shown one simple practical form of an arrangement utilizing the high motional impedance of the measuring instrument 44 when its coil moves for increasing by regenerative feed back the voltage impressed on the moving coil, and bring it promptly to the position of equilibrium of the new reading.

As shown in Fig. 2, a regenerative feed back connection from the output circuit connected to the measuring instrument 44 to the input circuit of the rotary condenser is provided by connecting across the meter supply leads 65, 66 a potentiometer 71, and connecting a lead 72 from a potentiometer tap 73 and an extension of the grounded meter lead 65 serially between two points of the input lead 26 to the rotary condenser. Adjustment of the feedback to the effective value is effected by shifting the potentiometer tap 71.

To assure that the regenerative feedback does not exceed a desired upper limit, the coil of the measuring instrument 44 has interconnected therewith an adjustable shunt resistor 74 and an adjustable series resistor 75 which are so set as to limit in a desired manner the maximum feedback regeneration in the system. With such arrangement, the tap 73 of the potentiometer 71 enables the adjustment of the amount of the regeneration to secure quick action of the pointer from one reading to a new reading, while at the same time preventing the pointer from overshooting. The potentiometer circuit and the circuit impedance elements 74, 75 interconnected with the meter movement are so proportioned and correlated as to assure that when the instrument is in an equilibrium position, the total regeneration is negligibly low and does not affect the accuracy of the instrument.

In practice, good results are obtained if the regeneration under equilibrium conditions is limited to less than 10%. However, the desired fast motion of the pointer of a highly sensitive D'Arsonval movement may be also obtained with the regeneration under equilibrium conditions of only about 1 or 1½%, and increasing about 3 to 4 times during the motion of the meter. The shunt and series resistances 74, 75 may be readily so chosen as to obtain as fast action of the meter movement as possible, while preventing oversweep and keeping them at values which do not materially reduce the sensitivity of the meter movement.

It may be also advantageous to connect a condenser 76 across the output of the commutator in order to smooth out the ripple of the rectified current. In order to assure that a rotary condenser measuring system of the type shown in Fig. 1 operates accurately and without disturbances, it is of extreme importance that the rotary condenser apparatus is manufactured and designed so that all the elements are maintained in a precisely balanced position.

As long as the rotary measuring systems of the type disclosed in my Patent 2,290,875, and shown in Fig. 1, are operated with measuring instruments 44 of ordinary sensitivity so that the full scale reading on the instrument corresponds to a measured input voltage of 100 millivolts or more, a rotary condenser measuring system of the foregoing type will operate without disturbing troubles, even if the rotary condenser apparatus is constructed with only the normal mechanical accuracy.

However, if such rotary condenser measuring system is operated with a more sensitive measuring instrument 44 in order to be able to measure input voltages of the order of only a few millivolts, such more sensitive measuring instrument 44 will indicate the presence of parasitic disturbances even when no voltage is impressed across the input terminals of the rotary condenser, or if the input terminals are short circuited.

As a result of extended experimentation and search, I have found that the parasitic disturbances indicated under such conditions by a highly sensitive measuring instrument forming part of the rotary condenser measuring system, are caused by the fact that the highly insulated rotor segments of opposite polarity, in rotating through the air past the adjacent stator segments, accumulate by friction electric charges, because of small mechanical inaccuracies in their relationship to their stator segments.

In other words, since the rotating segments of the rotary condenser apparatus are insulated, electrostatic charges are induced due to rotational friction in the air charging the rotor relatively to the stator. The potential difference between the rotor and stator segments caused by such frictionally induced charges, is fairly high. In many cases, this potential difference is much higher than the potential difference that is to be measured.

Most charges will accumulate on the segment parts of the rotor and stator which, because of some mechanical inaccuracy of the rotary condenser structure, are nearer to each other than other parts. As a result, the rotating condenser structure brings alternately different segments of the rotating condenser structure to the position in which they are nearest to the stator condenser structure, causing flow of disturbing parasitic surge currents through the meter circuit. The polarity of the charges accumulated by friction on the rotating condenser segments depends on the insulating materials which serve as their support. For instance, if the rotor segments are supported on hard rubber insulation, negative charges are accumulated in the rotor segments.

If such electric charges of the same polarity are accumulated on all condenser segments of opposite polarity, these charges would produce no effect on the measuring instrument if all the elements of the rotary condenser were geometrically perfect. By geometrically perfect is meant that all parallel parts of the structure should be ideally parallel and that all concentric circular parts should be ideally concentric. However, ideal conditions do not exist in practice, since the accuracy with which parts can be built is limited. In other words, condenser parts which should be theoretically parallel or concentric are practically not perfectly parallel nor perfectly concentric. Such conditions are indicated in an exaggerated way in the diagrammatic Figs. 3 and 4.

Fig. 3 shows a condenser apparatus having only two semi-cylindrical stator segments S, T cooperating with a rotor having two semi-cylindrical condenser segments Q, R, the rotor axis being mounted eccentrically with respect to the stator axis. Because of this eccentricity, the rotating rotor element R comes closer to the stator segments T, and will collect more electric charges than the rotor element Q which is farther spaced than the stator segment S and has a smaller capacitive coupling with it. After a half rotation, the relation of the two rotor sectors are interchanged, and the rotor segment Q accumulates a greater charge than rotor segment R. The surplus charges which are thus alternately accumulated on the two rotor segments, as they are rotated, will flow through the measuring circuit connecting the two rotor segments. This process of surplus charges surging from a rotor segment of one polarity to a rotor segment of opposite polarity repeats itself periodically during each complete rotation of the rotor.

As a result, the periodical surge currents produced by the surplus charges have the same frequency as measuring currents produced by the voltage induced in the rotor due to the measured D. C. voltage applied to the stator segments of the rotating condenser. Since these parasitic surge currents have the same frequency as the useful measuring currents, they are rectified with the same efficiency and give appreciable disturbing readings when very sensitive measuring instruments are used in the system. I have found that these parasitic disturbing currents retain their magnitude even if the stator segments of one polarity have a short circuit connection to the stator segments of opposite polarity in the manner indicated by the short circuit lead 78 in Fig. 3.

A similar effect of surging charges is produced if the stator and rotor consist of parallel disc segments of the type used in the commercial form of rotary condenser.

Such disc type of rotary condenser is shown diagrammatically in Fig. 4, wherein S—S and T—T are pairs of adjacent stator segments of opposite polarity and Q—R is a pair of rotor segments mounted for rotation between the adjacent pairs of stator segments. If the rotor segments are not exactly parallel with respect to the stator segments, in the way indicated in an exaggerated manner in Fig. 4, some portions of each rotor segment will be closer to the stator segments than other portions.

Under such conditions, the portions of the rotor segments which are closer to a stator segment will accumulate a greater charge than the portions which are further away. If the segments Q and R shown in Fig. 4 are of opposite polarity, the increased charge collected on both segments will be substantially equal and only very small parasitic surge currents, or no surges at all, will flow in the connecting measuring circuit. This is the case only when the rotary condenser has only one pair of rotor disc segments of opposite polarity, such as shown in Figs. 4 and 5, or an odd number of pairs of segments of opposite polarity, such as three pairs of segments shown in Fig. 6.

However, if such rotary condenser has an even number of pairs of rotor segments of opposite polarity, such as in the case illustrated in Fig. 7, for two pairs of segments of opposite polarity, disturbing conditions will occur for the following reasons: The segments which are diametrically opposite to each other, such as Q in Fig. 7, will occupy the positions of the segments Q and R shown in Fig. 2, and will have with respect to the stator segments a greater capacity than the other pair of segments R—R in Fig. 7, which are located more symmetrically with respect to the stator segments. Since, during the rotation, the two segments Q will interchange periodically their positions with the two segments R, there will occur a periodic accumulation of surplus charges on the pair of segments of the same polarity located in the positions corresponding to the segments Q—Q in Fig. 7, and the surplus charges accumulating on these segment pairs will periodically surge to the other pair of segments as they periodically interchange their positions. In other words, a rotary condenser system with an even pair of rotor disc segments of opposite polarity of the type shown in Fig. 7 will result in periodic surge currents of the very same type as described in connection with Fig. 3 for an eccentrically mounted rotor.

Because of the foregoing conditions, it is important to design rotary condenser measuring systems with an odd number of condenser segment pairs of opposite polarity. In other words, a rotary condenser apparatus for use in a measuring system of the invention should be made with either 9 or 11 pairs of segments of opposite polarity rather than with 10.

I have also found a simple way for compensating for dis-symmetries or other inaccuracies in the relation between the rotor and stator segments and the resulting differences in their capacitive relation which are responsible for the disturbing parasitic effects of the type described above.

The principle underlying such compensating arrangement of the invention will be explained in connection with the simple rotary condenser arrangement illustrated in Fig. 3, having only one pair of stator segments and one pair of rotor segments of opposite polarity. To compensate for the inaccuracies due to the eccentric relation of the rotor segments to the stator segments, each of the rotor segments Q and R have mounted for rotation therewith and connected thereto a small auxiliary compensating condenser segment X, Y, respectively, arranged to establish in periodical sequence a close capacitive coupling with a cooperating adjustably mounted additional single stationary compensating condenser segment Z having the angular width of one rotor segment, such as Q. As shown, the additional compensating condenser segment X, Y and the cooperating stationary condenser segment Z are arranged so as to make it possible to add a balancing capacity of adjustable magnitude and adjustable phase to the rotor segments Q and R when either one of these segments comes into position where its capacitive relation to the stator segments is less than the other.

Thus, in the case shown in Fig. 3, the grounded compensating element Z is shown in an angular position in which it forms, with one or the other of the rotary compensating segments X and Y, a compensating capacity which periodically is added to one or the other of the two rotor segments R and Q as it moves to the angular position in which its capacitive coupling with the stator segments is smaller than the capacitive coupling of the other rotor segment with the stator segment T.

The principle of compensating for the asymmetry or similar imperfections in the structure of the rotary condenser, explained in connection with Fig. 3, may be applied to rotary condensers having a large number of segments. In general, if such rotary condenser has a stator and rotor, each with cooperating condenser segments of opposite polarity, structural inaccuracies in the relation of the segments may be compensated for, by combining with its rotor a compensating condenser structure having for each of the N rotor segments, represented in Fig. 3, by the compensating segments X, Y, an auxiliary compensating condenser segment, each mechanically and electrically connected to its rotor segment, and arranged to rotate past a set of N/2 stationary grounded condenser segments of the same angular width, represented in Fig. 3 by the stationary segment Z, which are uniformly distributed opposite the twice as many rotary condenser segments. The set of stationary compensating segments Z is arranged so that it may adjustably move to increase or decrease their capacitive coupling with the rotary compensating segments X, Y, rotating past them, for instance, by reducing or increasing their spacing. In addition, the mounting of the set of stationary compensating segments is arranged so that it may be adjusted by angular rotation over 360 electrical degrees, corresponding to two adjacent rotor segments. In other words, the stationary set of compensating condenser segments Z is adjustably mounted to permit adjustment of the magnitude of the additive compensating capacity and adjustment of its phase relation to the stator segments.

In Figs. 8 to 12 is shown how a commercial rotary condenser apparatus of the type described in my Patent 2,290,875 may be combined with a compensating condenser structure of the type explained diagrammatically in connection with Fig. 3. The rotary condenser shown has a stator structure provided with an odd number of pairs of multi-disc condenser segments 81, such as shown in perspective in Fig. 11, assembled in the form of a generally cylindrical structure and held clamped between the end plates 82 of the rotary condenser, annular insulating spacer plates 83 keeping adjacent segments insulated from each other and from the end plates 82 between which they are clamped. As explained in my patent, and in connection with Fig. 1, alternate stator condenser sections and alternate rotor condenser segments are interconnected to form two stator aggregates of opposite polarity and two cooperating rotor aggregates of opposite polarity.

A similar set of cooperating multi-disc rotor segments 84, likewise individually insulated from each other and from other parts of the structure, is assembled in the form of a general cylinder, and is mounted on the rotating shaft 85 and held in clamped position by annular rotor insulating plates 86 which are suitably affixed to the shaft 85 as by an internally threaded clamping ring 87.

The cooperating compensating condenser structure has a rotary part corresponding to elements X, Y of Fig. 3, which is insulatingly mounted on the exterior side of one of the rotor insulating plates 86, and is formed of two rotary compensating condenser sections 91, 92 of opposite polarity, for cooperating with the two correspondingly aligned aggregates of rotor condenser segments of opposite polarity, with which they are connected mechanically and electrically.

As shown in Figs. 8 and 10, the rotary compensating condenser sections 91, 92 of opposite polarity have the general shape of a series of concentric cylinders extending from an annular supporting plate held by the insulating rotor plate 86, and subdivided into alternate radially interfitting insulated segments 93, 94 of opposite polarity, each segment having a series of outwardly projecting arcuate segmentally aligned condenser protrusions 95, 96, respectively, of the same angular width as a rotor segment 84. All compensating condenser segments 93 of one polarity extend from the common outer ring section member 91, and all segments 94 of opposite polarity extend from the common inner concentric ring section member 92. The rotating part of the compensating condenser structure consists thus of an array of radially extending segments 93, 94, equal in number to the rotor segments 84, alternate compensating condenser segments 93, 94, respectively, being of the same polarity and being electrically connected to the array of rotor segments 84 of the same polarity.

Means are also provided for making it possible to adjust the phase and the magnitude of the effective compensating capacity. As shown in Fig. 8, the annular supporting disc 101 of the stationary compensating condenser structure, is mounted for rotary adjustment on a cylindrical bushing 103 surrounding a projecting portion of the shaft 85, and it has two radial slots 104 arranged to be engaged by an actuating pin 105 held in a plug 106 threadedly mounted within a hole of the end plate 82 of the condenser structure for rotation by a knurled knob formed on its outer end. The pin 105 is eccentrically held with plug 106 so that a rotation of the plug will permit adjusted shifting of the stationary segmental condenser protrusions 101 to the right or left by a full angular width of a compensating condenser segment, such as 93 or 94. By providing the stationary supporting plate with two radial slots 104 located in adjacent segmental parts, it is possible to shift the phase relationship of the stationary compensating condenser segments fully 360 degrees. The eccentric coupling pin 105 is threadedly mounted in plug 106 and may be withdrawn to enable angular turning of the supporting plate 101 to bring either one of its radial shifting slots into coupling engagement with the plug pin 105.

A complementary stationary compensating condenser structure, corresponding to element Z of Fig. 3, is formed on a single annular supporting disc 101 facing the ends of the annular array of segmentally aligned rotating arcuate condenser protrusions 95, 96 of the rotating compensating condenser structure. For each two consecutive segmentally aligned sets of rotating protrusions 95, 96 of opposite polarity, the annular supporting disc 101 has a single similar complementary set of segmentally aligned protrusions 102 having the same angular width as a rotor segment and extending into spaces between and overlapping the rotating condenser protrusions 95, 96, so as to alternately establish capacitive coupling with a rotating condenser protrusion of opposite polarity.

The supporting disc 101 of the stationary compensating condenser structure is also shown arranged to be adjustably shifted along its bushing 103 against the outward biasing action of a helical spring 108, by turning three or more set screws 107, threadedly held in annularly spaced holes of the end plate. The spring 108 tends to move the supporting plate 101 and its condenser protrusions 102 inwardly. By turning the set screws 107 in one or the other direction, the magnitude of the compensating condenser action may be adjusted.

A rotary condenser apparatus embodying compensating condenser elements to compensate for mechanical inaccuracies in the relationship of the condenser elements, an exemplification of which and one practical form of which was explained above in connection with Figs. 2 to 12, operates with such a degree of accuracy as to make it possible to use as a part of the measuring circuit a stabilized feedback D. C. amplifier which is compensated for any variations in its circuit elements so as to form therewith a measuring circuit of any desired higher degree of sensitivity than possible with a measuring device directly connected thereto, in the manner explained in connection with Fig. 2.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and actuated to produce periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said measuring device having a magnetic field element and an actuating coil element energized by said measuring circuit and interlinked with said field element, and said coil and said field element being movable one relatively to the other so as to assume a relative measurement position indicative of the potential difference applied to said inducing sections; and feedback means including a positive feedback path between said measuring circuit and the inducing condenser sheets for applying thereto a predetermined component of the voltage impressed on said measuring device.

2. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and actuated to produce periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said measuring device having a magnetic field element and an actuating coil element energized by said measuring circuit and interlinked with said field element, and said coil and said field element being movable one relatively to the other so as to assume a relative measurement position indicative of the potential difference applied to said inducing sections; and feedback means including a positive feedback path between said measuring circuit and the inducing condenser sheets for applying thereto a predetermined component of the voltage impressed on said measuring device; said measuring circuit and said feedback means being designed and correlated to maintain the feedback effect at a negligible level when the measuring circuit is in equilibrium and to increase the feedback effect to a substantial level when said measuring device is actuated from one measurement position to another.

3. In a rotary condenser measuring system having a rotary condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and arranged to be rotated relatively thereto for producing periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said measuring device having a magnetic field element and an actuating coil element energized by said measuring circuit and interlinked with said field element, and said coil element being movable relatively to said field element so as to assume a measurement position indicative of the potential difference applied to said inducing sections; and feedback means including a positive feedback path between said measuring circuit and the inducing condenser sheets for applying thereto a predetermined component of the voltage impressed on said measuring device; said measuring circuit and said feedback means being so designed and correlated as to maintain the feedback effect at a negligible level when said measuring device is stationary and to increase the feedback effect to a substantial level when the movable element of said measuring device moves.

4. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and means for producing periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; the impedance of said measuring device being subjected to predetermined variations when said measuring device is actuated from one equilibrium condition to another equilibrium condition and feedback means including a positive feedback path between said measuring circuit and said inducing condenser sheets for applying thereto a predetermined component of the voltage impressed on said measuring device; said measuring circuit and said feedback means being designed and correlated to maintain the feedback effect at a predetermined low level when said measuring device is in an equilibrium condition and to increase the feedback effect to a substantially higher level when said measuring device is actuated from one equilibrium condition to another equilibrium condition.

5. In a rotary condenser measuring system having a rotary condenser apparatus comprising an inducing condenser member having two sections of condenser sheets of opposite polarity connected to two points of the potential difference of which is to be measured, an induced condenser member having two sections of condenser sheets of opposite polarity capacitively coupled to said inducing condenser sheets and arranged to be rotated relatively thereto for producing periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said measuring device having a movable element actuated to move to different measurement positions indicative of the potential differences applied to said inducing sections and the impedance of said measuring device being subjected to predetermined variations when said measuring device is actuated from one measuring position to another measuring position and feedback means including a positive feedback path between said measuring circuit and said inducing condenser sheets for applying thereto a predetermined component of the voltage impressed on said measuring device; said measuring circuit and said feedback means being designed and correlated to maintain the feedback effect at a predetermined low level when said measuring device is in an equilibrium condition and to increase the feedback effect to a substantially higher level when said measuring device is actuated from one equilibrium condition to another equilibrium condition.

6. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and means for producing periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said inducing condenser member and said induced condenser member each having an odd number of pairs of condenser sheet sections of opposite polarity; the impedance of said measuring device being subjected to predetermined variations when said measuring device is actuated from one equilibrium condition to another equilibrium condition; and feedback means including a positive feedback path between said measuring circuit and said inducing condenser sheets for applying thereto a predetermined component of the voltage impressed on said measuring device; said measuring circuit and said feedback means being designed and correlated to maintain the feedback effect at a predetermined low level when said measuring device is in an equilibrium condition and to increase the feedback effect to a substantially higher level when said measuring device is actuated from one equilibrium condition to another equilibrium condition.

7. In a rotary condenser measuring system having a rotary condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and arranged to be rotated relatively thereto for producing periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said inducing condenser member and said induced condenser member each having an odd number of pairs of condenser sheet sections of opposite polarity; said measuring device having a movable element actuated to move to different measurement positions indicative of the potential differences applied to said inducing sections and the impedance of said measuring device being subjected to predetermined variations when said measuring device is actuated from one measuring position to another measuring position; and feedback means including a positive feedback path between said measuring circuit and said inducing condenser sheets for applying thereto a predetermined component of the voltage impressed on said measuring device; said measuring circuit and said feedback means being designed and correlated to maintain the feedback effect at a predetermined low level when the movable element of said measuring device is stationary and to increase the feedback effect to a substantially higher level when the movable element of said measuring device is actuated from one measuring position to another measuring position.

8. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and actuated to produce periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; and compensating means including a pair of compensating condenser elements of opposite polarity connected to two sections of condenser sheets of opposite polarity of one of said condenser members, and an additional compensating condenser element arranged and positioned to periodically establish variable capacitive coupling in sequence with each of said pair of compensating condenser elements and in synchronism with the periodical variations of the capacitive coupling between the inducing and induced sheets so as to compensate for inaccuracies in the geometrical relation between the condenser sheets of the inducing and induced members.

9. In a rotary condenser measuring system having a rotary condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and arranged to be rotated relatively thereto for producing periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; and compensating means including a pair of compensating condenser elements of opposite polarity connected to two sections of condenser sheets of opposite polarity of one of said condenser members, and an additional compensating condenser element arranged and positioned to periodically establish variable capacitive coupling in sequence with each of said pair of compensating condenser elements and in synchronism with the periodical variations of the capacitive coupling between the inducing and induced sheets so as to compensate for inaccuracies in the geometrical relation between the condenser sheets of the inducing and induced members; said inducing condenser member and said induced condenser member each having an odd number of pairs of condenser sheet sections of opposite polarity.

10. A measuring system as defined by claim 4 in which portions of the circuits connected to said measuring device have interconnected thereto circuit elements so proportioned and correlated to the other parts of said circuits as to limit the maximum feedback voltage applied by said measuring circuit to the inducing condenser sheets.

11. A measuring system as defined by claim 4 in which the measuring circuit includes a transformer connected to the induced condenser sections of opposite polarity for connecting the portion of the measuring circuit including said measuring device to the portion of the measuring circuit including said inductive impedance; and in which portions of the circuits connected to said measuring device have interconnected thereto circuit elements so proportioned and correlated to the other parts of said circuits as to limit the maximum feedback voltage applied by said measuring circuit to the inducing condenser sheets.

12. A measuring system as defined by claim 4 in which the measuring circuit includes a transformer connected to the induced condenser sections of opposite polarity for connecting the portion of the measuring circuit including said measuring device to the portion of the measuring circuit including said inductive impedance, and balanced rectifying means interconnected between said transformer and said measuring device; and in which portions of the circuits connected to said measuring device have interconnected thereto circuit elements so proportioned and correlated to the other parts of said circuits as to limit the maximum feedback voltage applied by said measuring circuit to the inducing condenser sheets.

13. A measuring system as defined by claim 6 having compensating means including a pair of compensating condenser elements of opposite polarity connected to two sections of condenser sheets of opposite polarity of one of said condenser members, and an additional compensating condenser element arranged and positioned to periodically establish variable capacitive coupling in sequence with each of said pair of compensating condenser elements and in synchronism with the periodical variations of the capacitive coupling between the inducing and induced sheets so as to compensate for inaccuracies in the geometrical relation between the condenser sheets of the inducing and induced members.

14. A measuring system as defined by claim 8 in which said inducing condenser member and said induced condenser member each has an odd number of pairs of condenser sheet sections of opposite polarity.

15. A measuring system as defined by claim 8 having means including a movable actuating member for adjusting the phase relation of said additional condenser element to the condenser sheets of the other of said condenser members.

16. A measuring system as defined by claim 8 having means including a movable actuating member for adjusting the maximum capacitive coupling of said additional condenser element to said pair of condenser elements.

17. A measuring system as defined by claim 8 having means including a movable actuating member for adjusting the maximum capacitive coupling of said additional condenser element to said pair of condenser elements and in which said pair of compensating condenser elements is mechanically and electrically connected to the condenser member which rotates.

18. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and actuated to produce periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; said measuring device having a magnetic field element and an actuating coil element energized by said measuring circuit and interlinked with said field element, and said coil and said field elements being movable one relatively to the other so as to assume a relative measurement position indicative of the potential difference applied to said inducing sections; and feedback means including a positive feedback path between said measuring circuit and the inducing condenser sheets for applying thereto a predetermined component of the voltage impressed on said measuring device; and compensating means including a pair of compensating condenser elements of opposite polarity connected to two sections of condenser sheets of opposite polarity of one of said condenser members, and an additional compensating condenser element arranged and positioned to periodically establish variable capacitive coupling in sequence with each of said pairs of compensating condenser elements and in synchronism with the periodical variations of the capacitive coupling between the inducing and induced sheets so as to compensate for inaccuracies in the geometrical relation between the condenser sheets of the inducing and induced members.

19. In a condenser measuring system having a condenser apparatus comprising an inducing condenser member having two sections of condenser sheets of opposite polarity connected to two points the potential difference of which is to be measured, an induced condenser member having two sections of condenser sheets of opposite polarity capacitively coupled to said inducing condenser sheets and actuated to produce periodical substantially constant-frequency variations of the capacitive coupling between the inducing and induced sheets so as to generate in the induced condenser sections voltage alternations of relatively high frequency proportional to the potential difference applied to said induced condenser sections of opposite polarity: a rectifying measuring circuit including a measuring device actuated by energy generated in said induced condenser sections and inductive means designed and proportioned to constitute an effective inductance having at the frequency of said alternations an inductive impedance of the order of the capacitive impedance formed by the inducing and induced condenser sections in their condition of maximum capacitive coupling; the impedance of said measuring device being subjected to predetermined variations when said measuring device is actuated from one equilibrium condition to another equilibrium condition; and compensating means including a pair of compensating condenser elements of opposite polarity connected to two sections of condenser sheets of opposite polarity of one of said condenser members, and an additional compensating condenser element arranged and positioned to periodically establish variable capacitive coupling in sequence with each of said pairs of compensating condenser elements and in synchronism with the periodical variations of the capacitive coupling between the inducing and induced sheets so as to compensate for inaccuracies in the geometrical relation between the condenser sheets of the inducing and induced members.

20. A measuring system as defined by claim 1 in which portions of the circuits connected to said measuring device have interconnected thereto circuit elements so proportioned and correlated to the other parts of said circuits as to limit the maximum feedback voltage applied by said measuring circuit to the inducing condenser sheets.

21. A measuring system as defined by claim 1 in which the measuring circuit includes a transformer connected to the induced condenser sections of opposite polarity for connecting the portion of the measuring circuit including said measuring device to the portion of the measuring circuit including said inductive impedance; and in which portions of the circuits connected to said measuring device have interconnected thereto circuit elements so proportioned and correlated to the other parts of said circuits as to limit the maximum feedback voltage applied by said measuring circuit to the inducing condenser sheets.

22. A measuring system as defined by claim 1 in which the measuring circuit includes a transformer connected to the induced condenser sections of opposite polarity for connecting the portion of the measuring circuit including said measuring device to the portion of the measuring circuit including said inductive impedance, and balanced rectifying means interconnected between said transformer and said measuring device; and in which portions of the circuits connected to said measuring device have interconnected thereto circuit elements so proportioned and correlated to the other parts of said circuits as to limit the maximum feedback voltage applied by said measuring circuit to the inducing condenser sheets.

23. A measuring system as defined by claim 18 having means including a movable actuating member for adjusting the phase relation of said additional condenser element to the condenser sheets of the other of said condenser members.

24. A measuring system as defined by claim 18 having means including a movable actuating member for adjusting the maximum capacitive coupling of said additional condenser element to said pair of condenser elements.

25. A measuring system as defined by claim 18 having means including a movable actuating member for adjusting the maximum capacitive coupling of said additional condenser element to said pair of condenser elements and in which said pair of compensating condenser elements is mechanically and electrically connected to the condenser member which rotates.

26. A measuring system as defined by claim 19 having means including a movable actuating member for adjusting the phase relation of said additional condenser element to the condenser sheets of the other of said condenser members.

27. A measuring system as defined by claim 19 having means including a movable actuating member for adjusting the maximum capacitive coupling of said additional condenser element to said pair of condenser elements.

28. A measuring system as defined by claim 19 having means including a movable actuating member for adjusting the maximum capacitive coupling of said additional condenser element to said pair of condenser elements and in which said pair of compensating condenser elements is mechanically and electrically connected to the condenser member which rotates.

EMIL H. GREIBACH.